J. FROELICH.
SWIVEL JAWS FOR MUSKRAT TRAPS.
APPLICATION FILED JULY 25, 1919.
1,316,024.
Patented Sept. 16, 1919.
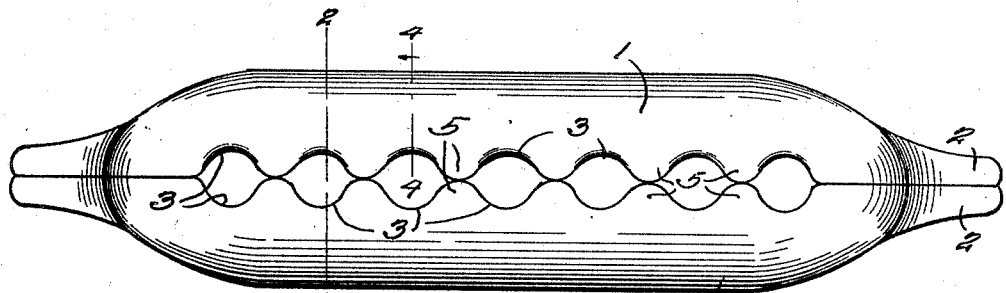
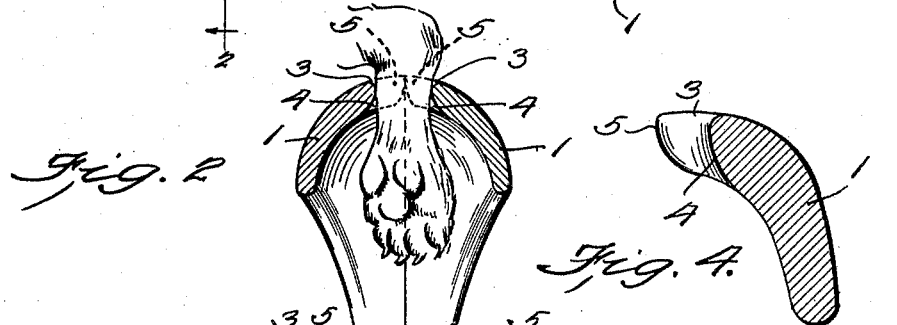
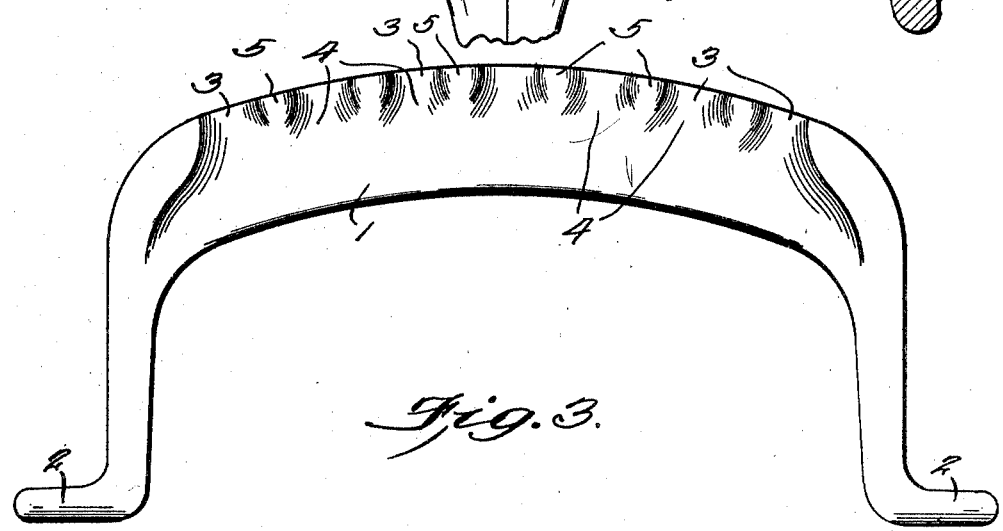
Inventor
Joseph Froelich
Attorneys

UNITED STATES PATENT OFFICE.

JOSEPH FROELICH, OF SAYNER, WISCONSIN.

SWIVEL-JAWS FOR MUSKRAT-TRAPS.

1,316,024.　　　　　Specification of Letters Patent.　　Patented Sept. 16, 1919.

Application filed July 25, 1919. Serial No. 313,326.

*To all whom it may concern:*

Be it known that I, JOSEPH FROELICH, a citizen of the United States, residing in Sayner, county of Vilas, and State of Wisconsin, have invented new and useful Swivel-Jaws for Muskrat-Traps, of which the following is a specification.

The object of my invention is to provide jaws for traps so shaped as to prevent the trapped animal from withdrawing his leg or foot, but permitting his leg to turn comparatively freely in the trap instead of being held tightly as in traps heretofore devised, it being my purpose to provide a trap which will not enable the animal to twist his leg off and thus escape as muskrats frequently do from the traps in general use. It is further my object to provide jaws adapted to be substituted for the jaws of traps already in use, so that the trapper need only purchase the new swivel jaws which I have devised and may apply them to the traps which he already owns. I attain the objects of my invention by the device illustrated in the accompanying drawings, in which—

Figure 1 is a top plan; Fig. 3 is a perspective of one of the jaws; Fig. 2 is a section on line 2—2 of Fig. 1; and Fig. 4 is a section enlarged, on line 4—4 of Fig. 1.

Like numerals designate like parts in each of the views.

Referring to the accompanying drawings I provide a jaw 1 having outturned ends 2 by means of which it is hingedly mounted in the trap frame. Each jaw is provided with semi-circular recessed portions 3 spaced apart from each other by the rounded or blunt intervening portions 4. On the other side of the trap jaw I provide novel funnel-shaped grooves opening into each of the semi-circular recess portions, and providing a continuous curve and smooth surface which permits the leg of the trapped animal to rotate or swivel in the trap but is not large enough for the animal to pull his foot through or escape. As the intervening portions 4 are small and blunt, as shown in the drawings, if they hit the leg when closing they will not enter or tear the flesh, but the force of the trap will force the leg of the animal into one of the circular recess portions 3 of the jaw, or the slightest twisting of his leg by the muskrat will turn the leg into one of the recess portions where it can swivel about without permitting his escape.

If a muskrat should be caught in the swivel jaw by his hind leg he would be held firm as in any other patent trap, because the bones in the hind legs are so large that they would not fit into the holes, but it is not necessary for a hind leg to swivel as a muskrat will very seldom twist off a hind leg. But if a muskrat is caught above the knee on the hind leg it will swivel the same as the fore leg as the bone is small there.

These jaws are to be made to fit any make of patent trap on the market so that trappers would not have to buy a whole new supply of traps, but only new jaws to fit their old traps, to increase their catch of fur.

What I claim is:

Swivel jaws for traps, each of said jaws having outturned ends for mounting the jaws in the trap, and having opposite semi-circular recessed portions, and having funnel-shaped grooves on the underside of the jaws opening into said recess portions to provide a smooth round opening in which the leg of the trapped animal may swivel, and having blunt intervening portions to prevent their entering or tearing the flesh, substantially as and for the purposes described.

JOSEPH FROELICH.

Copies of this patent may be obtained for five cents each, by addressing the "Commissioner of Patents, Washington, D. C."